US007578916B2

(12) United States Patent
Bryning

(10) Patent No.: US 7,578,916 B2
(45) Date of Patent: Aug. 25, 2009

(54) EMULSIONS OF IONIC LIQUIDS

(75) Inventor: Zbigniew T. Bryning, Campbell, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 876 days.

(21) Appl. No.: 10/853,911

(22) Filed: May 25, 2004

(65) Prior Publication Data

US 2005/0274617 A1 Dec. 15, 2005

(51) Int. Cl.

| | |
|---|---|
| ***B01D 57/02*** | (2006.01) |
| ***C25B 7/00*** | (2006.01) |
| ***B01F 3/08*** | (2006.01) |
| ***B01F 17/00*** | (2006.01) |

(52) U.S. Cl. ......................... 204/451; 204/601; 516/53; 516/9; 516/21

(58) Field of Classification Search ................. 204/451, 204/601; 516/9, 21, 53

See application file for complete search history.

(56) References Cited

U.S. PATENT DOCUMENTS

| | | | | |
|---|---|---|---|---|
| 5,429,734 | A | 7/1995 | Gajar et al. | |
| 5,580,434 | A * | 12/1996 | Robotti et al. | 204/451 |
| 6,524,456 | B1 * | 2/2003 | Ramsey et al. | 204/450 |
| 2004/0234966 | A1 * | 11/2004 | Bryning et al. | 435/6 |

FOREIGN PATENT DOCUMENTS

WO WO 2004/024279 A2 3/2004

OTHER PUBLICATIONS

Qin et al., "1,3-Dialkylimidazolium-based room-temperature ionic liquids as background electrolyte and coating material in aqueous capillary electrophoresis", Journal of Chromatography A, vol. 985, No. 1-2, Jan. 24, 2003, pp. 447-454.*

Kapnissi et al., "Chiral Separations Using Polymeric Surfactants and Polyelectrolyte Multilayers in Open-Tubular Capillary Electrochromatography", Analytical Chemistry, vol. 75, No. 22, Nov. 15, 2003, pp. 6097-6104.*

Altria, K.D. et al., "The effect of Operating Variables in Microemulsion Electrokinetic Chromatography," *Chromatographia*, 52:758-768 (2000).

Altria, K.D. et al., "Application of Microemulsion Electrokinetic Chromatography to the Analysis of a Wide Range of Pharmaceuticals and Excipients," *J. Chromatogr.*, 844: 371-386 (1999).

Boso, R. L. et al., *J. Chromatog.*, 709:11-19 (1995).

Debusschere, L. et al., "Separation of Cardiac Glycosides by Micellar Electrokinetic Chromatography and Microemulsion Electrokinetic Chromatography," *J. Chromatog.*, 779:227-233 (1997).

Fu, X., et al., *J. Chromatogr.*, 735:353-356 (1996).

Li, G. et al., *Analyst*, 123:1501-1505 (1998).

Sicoli, F., et al., "Shape Fluctuations of Microemulsion Droplets," *J. Phys. Chem.*, 99:14819-14823 (1995).

(Continued)

*Primary Examiner*—Alex Noguerola
*Assistant Examiner*—J. Christopher Ball

(57) ABSTRACT

The present teachings provide emulsions using ionic liquids for separation of biomolecules and related methods, compositions, and devices.

13 Claims, 3 Drawing Sheets

OTHER PUBLICATIONS

Song, L. et al., *J. Chromatogr.*, 699:371-382 (1995).

Terabe, S. et al., "Microemulsion Electrokinetic Chromatography: Comparison With Micellar Electrokinetic Chromatography," *J. Chromatogr.*, 608:23-29 (1992).

Zhou, G-H. et al., *J. Chromatogr.*, 853:277-284 (1999).

Aiken et.al., "Use Of A Microemulsion System To Incorporate A Lipophilic Chiral Selector In Electrokinetic Capillary Chromatography" Chromatographia vol. 35, No. 7/8, Apr. 1993, pp. 448-450.

Szucs et.al., "Micellar And Microemulsion Electrokinetic Chromatography Of Hop Bitter Acids" J. High Resol Chromatography, vol. 19, Apr. 1996, pp. 189-192.

Vomastova, et al., "Microemulsion And Micellar Electrokinetic Chromatography Of Steroids" Journal of Chromatography B, 681, 1996, pp. 107-113.

Watarai et. al., "Comparison Of Three Different Microemulsion Systems As The Run Buffer For The Capillary Electrophoretic Separation of Ketone Test Solutes", Anal. Commun., 1998, 35, pp. 289-292.

Khaledi, Micelles As Separation Media In High-Performance Liquid Chromatography And High-Performance Capillary Electrophoresis: Overview and Perspective, Journal of Chromatography A, vol. 780,(1997), pp. 3-40.

Seddon, Ionic Liquids For Clean Technology, J. Chem. Tech. Biotechnol., 1997, vol. 68, pp. 351-356.

International Search Report for International application No. PCT/US2005/018697 dated Oct. 4, 2005; along with Written Opinion of the ISA.

* cited by examiner

EMULSIONS OF IONIC LIQUIDS

FIELD

The present teachings relate to methods for creating an emulsion of ionic liquids and methods for separating mixtures of chemical and/or biological components in the emulsions. The present teachings can also relate to methods for creating an emulsion in a capillary.

INTRODUCTION

Electrophoresis as known in the art of handling a biological sample can include a process of handling, such as concentrating and/or separating charged species in the biological sample. The term "biological sample" as used herein can refer to components in biological fluids (e.g. blood, lymph, urine, sweat, etc.), reactants, and/or reaction products, any of which can include peptides, nucleotides, or other charged species. One example of electrophoresis is capillary electrophoresis. Capillary electrophoresis devices can, for example, be used to separate various charged species present in a liquid sample, such as a biological sample. The charged species present in the biological sample migrate through the capillary under an applied voltage created by a voltage source, such as an electrode wherein the ions are pulled through the capillary.

Emulsions can include at least one surfactant and at least two buffers, such as water and a non-aqueous solvent. One type of emulsion, commonly known as an oil-in-water (o/w) emulsion, has a continuous phase (water) and a disperse phase (droplets of non-aqueous solvent stabilized by a surfactant). Another type of emulsion, commonly known as a water-in-oil (w/o) emulsion, has a disperse aqueous phase and a continuous non-aqueous phase.

Emulsions and solid phases, for example solid beads, are commonly used in separation techniques from classical chromatography to micro-emulsion electrokinetic capillary chromatography (MEEKC). The emulsions or beads are created outside separation columns or capillaries and then inserted into the columns or capillaries. However, the packaging of the emulsion or beads into small capillaries or, alternatively, in integrated microdevices can be very difficult. It can be desirable to form an emulsion inside a small capillary or integrated microdevice.

SUMMARY

In various embodiments, the present teachings can provide a method for providing an emulsion in a capillary including introducing into the capillary a composition including a buffer and an ionic liquid; and applying a voltage across the composition to form an emulsion. In various embodiments, a method for creating an emulsion can include contacting a sample including a solute with a composition including a buffer and an ionic liquid; and applying a voltage across the composition to form an emulsion.

In various embodiments, the present teachings can provide a method for creating beads inside a capillary including inserting in the capillary a composition including a buffer and an ionic liquid; applying a voltage across the composition to form an emulsion; and solidifying the emulsion droplets to form beads.

In various embodiments, a method for separating a solute from a sample can include applying a voltage across a composition including the sample, an ionic liquid, and a buffer to form an emulsion; and separating the solute from the sample. In various embodiments, a method for separating a solute from a sample can include applying a voltage across a composition including the sample, a buffer, and an ionic liquid to form an emulsion; packing the emulsion droplets against a barrier; and stripping the solute from the emulsion.

It is to be understood that both the foregoing general description and the following description of various embodiments are exemplary and explanatory only and are not restrictive.

BRIEF DESCRIPTION OF THE DRAWINGS

The accompanying drawings, which are incorporated in and constitute a part of this specification, illustrate various embodiments.

DESCRIPTION OF VARIOUS EMBODIMENTS

Figure 1A:
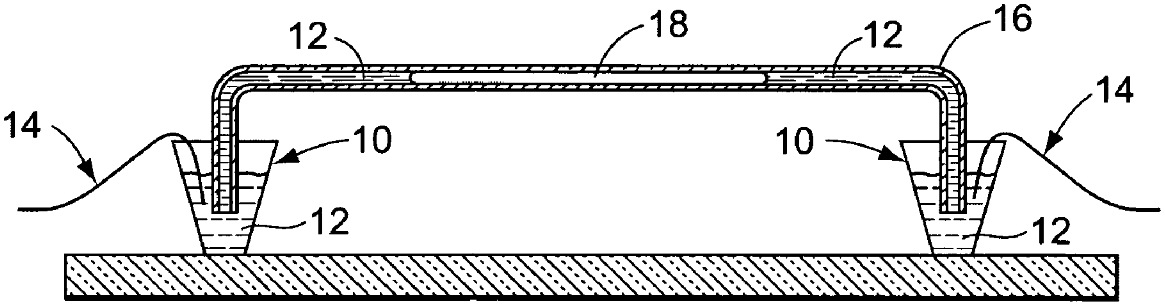
FIG. 1 illustrates a cross-section of various embodiments of a capillary with a buffer segment between two ionic liquid segments.

Reference will now be made to various exemplary embodiments, examples of which are illustrated in the accompanying drawings. Wherever possible, the same reference numbers are used in the drawings and the description to refer to the same or like parts.

In various embodiments, as illustrated in FIGS. 1-5B, the present teachings can relate to methods for creating an emulsion in a capillary. In various embodiments, FIG. 1 illustrates reservoirs 10 containing ionic liquid 12, electrode 14, capillary 16, and buffer 18. Capillary 16 can be shaped such that its ends are submerged below the surface of the ionic liquid 12 in the reservoir 10. Submerging the openings of capillary 16 provides a continuous ionic liquid segment from the reservoir 10 and into the capillary 16 on either end of a segment of buffer 18. The term "segment" refers to a section of liquid. Electrode 14 can be a platinum wire or any other appropriate material to apply a current across the ionic liquid segments and buffer segment. The material and dimensions of the capillary device are illustrative and can be altered by one skilled in the art of microfluidics to any material and dimensions. For example, the capillary can be used in an integrated microdevice, such as a microfluidics device. FIG. 1 is illustrative and any configuration can be used.

In various embodiments, channels, including microchannels can be used instead of capillaries. Microchannels can be desirable channels because they provide several advantages over capillaries. Microchannels can facilitate manufacturing and manipulation of liquids by filling access holes to prevent evaporation. The ionic liquid segment and buffer segment can be introduced by applying vacuum, centripetal forces, active or passive capillary forces, and/or pressure.

A composition, for example, which can be used in the disclosed embodiments can include an ionic liquid and a buffer. The term "ionic liquid" refers to salts that are liquid over a wide temperature range, including room temperature. Ionic liquids have been described at http://bama.ua.edu/~rdrogers/webdocs/RTIL. Variations in cations and anions can produce millions of ionic liquids, including chiral, fluorinated, and antibacterial ionic liquids. The large number of possibilities can provide ionic liquid properties tailored to specific applications. Ionic liquids can be desirable because they are environmentally-friendly alternatives to organic solvents for liquid/liquid extractions, catalysis, separations, and electrochemistry. Ionic liquids can reduce the cost, disposal requirements, and hazards associated with volatile organic compounds. Exemplary properties of ionic liquids include at least one of high ionic conductivity, non-volatility, non-flammability, high thermal stability, wide temperature for liquid phase, highly solvability, and non-coordinating.

The choice of cations and anions determine the physical properties (e.g. melting point, viscosity, density, water solubility, etc.) of the ionic liquid. For example, cations can be big, bulky, and asymmetric, possibly resulting in an ionic liquid with a low melting point. As another example, anions can contribute more to the overall characteristics of the ionic liquid, such as air and water stability. The melting point for ionic liquids can be changed by structural variation of at least one of the ions or combining different ions.

Examples of ionic liquid cations can include N-butylpyridinium and 1-alkyl-3-methylimidazolium (1,3-dialkylimidazolium; alkyl mim). Examples of anions can include $PF_6$ that is immiscible in water, and $BF_4^-$ that is miscible in water depending on the ratio of ionic liquid to water, system temperature, and alkyl chain length of cation. Other anions can include triflate (TfO; $CF_3SO_2^-$), nonaflate (NfO; $CF_3(CF_2)_3SO_2^-$), bis(triflyl)amide ($Tf_2N$; $(CF_3SO_2)_2N^-$), trifluoroacetate (TA; $CF_3CO_2^-$), and nonafluorobutanoate (HB; $CF_3(CF_2)_3CO_2^-$). Other examples of ionic liquids can include haloaluminates such as chloroaluminate. Chloro- and bromo-ionic liquids can have large electrochemical windows because molten salts prevent salvation and solvolysis of the metal ion species. Further examples of ionic liquids can include 1-alkyl-3-methylimidazolium $PF_6$ such as 1-decyl-3-methylimidazolium $PF_6$, 1-butyl-3-methylimidazolium $PF_6$, and 1-ethyl-3-methylimidazolium with $NO_3$, $NO_2$, $MeCO_2$, $SO_4$, $PF_6$, TfO, NfO, $BF_4$, $Tf_2N$, and TA, N-alkylpyridinium chloride or N-alkylpyridium nickel chloride with $C_{12}$ to $C_{18}$ alkyl chains, and any variations of these as are known to one skilled in the art of ionic fluids. Other examples include 1-ethyl-3-methylimidazolium bis(1,2-benzenediolato-O,O') borate, 1-ethyl-3-methylimidazolium bis(salicylato)borate, 1-ethyl-3-methylimidazolium bis(oxalate)borate, and other compounds described in U.S. Pub. No. 2002/0015883 to Hilarius, et al., and N-alkyl-N'-alkoxyalkylimidazolium ionic liquids such as those described in Japanese Publication 2002/003478.

Sources of ionic liquids include Aldrich (Milwaukee, Wis.), Elementis Corp. (Durham, UK), Sachem (Austin, Tex.), TCI (Tokyo, Kasei), and Quill (N. Ireland).

The term "buffer" herein refers to liquids that do not mix with ionic liquids. The buffer facilitates movement of the charged species through the capillary by providing a transportation medium through which the charged species travels. Buffers can be aqueous (containing water), or they can be non-polar organic solvents such as DMF, DMSO, xylene, octane, perfluorodecalin, and other hydrocarbons that can be at least partially soluble with the biological material. Buffers can be aqueous or organic because ionic liquids can be hydrophilic or hydrophobic. In various embodiments, hydrophobic ionic liquid segments of 1-butyl-3-methylimidazolium hexafluorophosphate (BMI $PF_6$) and 1,2-dimethyl-3-butylimidazolium hexafluorophosphate (DMBI $PF_6$) from Sachem, Inc. (Austin, Tex.) can be used with aqueous buffer segments, and hydrophilic ionic liquid segments of 1-ethyl-3-methylimidazolium tetrafluoroborate (EMI $BF_4$) and 1-ethyl-3-methylimidazolium trifluoromethanesulfonate (EMI TFMS) from TCI (Tokyo Kasei) can be used with non-polar organic solvent buffer segments.

The buffer segment can include a biological sample including a solute. The solute can be chosen from a particle, such as a silica particle or an inert particle, and a charged species, for example a positively charged species or a negatively charged species. For example, the solute can be chosen from biomolecules and bioparticles. In various embodiments, the term "biomolecules" refers to any molecule associated with a life function. Suitable non-limiting examples of biomolecules include proteins, peptides, nucleotides, DNA, and RNA.

In various embodiments, the term "bioparticles" refers to particles formed by, or useful in, any biological process. Suitable non-limiting examples of bioparticles include cells, cell organelles, cell aggregates, tissue, bacteria, protozoans, viruses, and other small organisms.

In various embodiments, the solute can act as a "seed" or an initiator of the formation of the emulsion. For example, the charged species present in the solute can become associated with the emulsion droplets. The term "associated" and grammatical variations thereof as used herein refers to a situation wherein the charged species and the emulsion droplets are joined or connected together in a spatial relationship. For example, the charged species can be bound to the emulsion droplets either directly or indirectly. The association of the charged species with the emulsion droplet can transport charged species through the ionic liquid by the emulsion droplet. For example, DNA can act as a seed to form emulsion droplets, which can associate with the DNA. Due to the applied voltage, the associated emulsion droplets and DNA can then be transported to an electrode, such as a positive electrode of the capillary, to form a compacted emulsion.

The biological sample can be adapted for at least one of PCR, ligase chain reaction, antibody binding reaction, oligonucleotide ligations assay, and hybridization assay. The sample can then be detected by at least one of absorbance, fluorescence spectroscopy, Raman spectroscopy, reflectance, and colorimetry.

In various embodiments, a composition including a buffer and an ionic liquid is introduced into a capillary. A voltage is then applied across the composition to form an emulsion.

The voltage can be applied for a sufficient period of time for an emulsion to form. The voltage can be applied from 1 minute to 48 hours, for example from 1 minute to 24 hours, as a further example from 2 minutes to 5 minutes.

The voltage applied across the composition can range from 100 v to 2000 v, for example from 500 v to 1000 v. Depending upon the length of the capillary, the electric field strength can vary. For example, the electric field strength can range from 1 v/cm to 1000 v/cm. By varying the electric field, the solute can be transported through the ionic liquid. Moreover, once an emulsion is formed, the solute can become disassociated or separated from the emulsion droplets by increasing and/or reversing the voltage from the initial voltage used to create the emulsion.

Figure 5A:
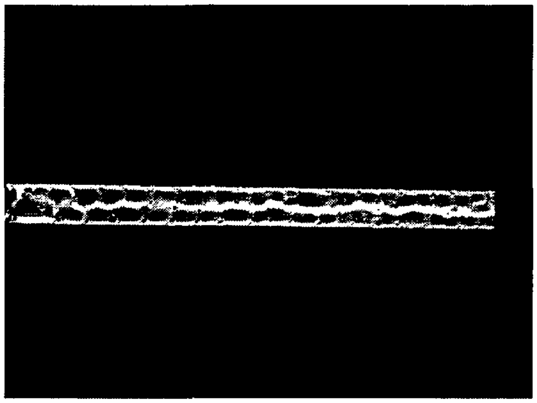
FIGS. 5A-B illustrate fluorescent images of an embodiment of the present teachings showing the coalescing of emulsion droplets after a period of time.
Figure 5B:
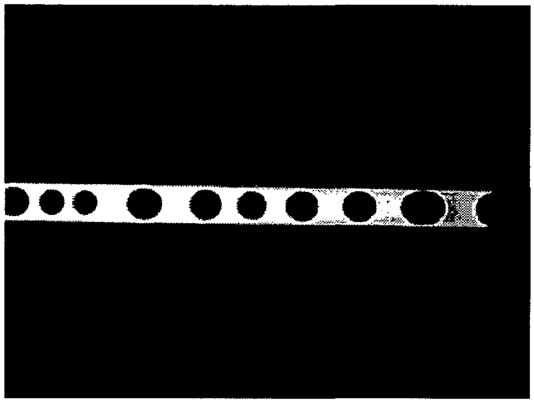

In various embodiments, an emulsion can include emulsion droplets. The size, shape, electric charge, and polarizability of the emulsion droplets can depend on several factors, including, for example, the properties of the biomolecules or bioparticles present in the biological sample. For example, the size of the emulsion droplets can be controlled by at least one of the buffer composition, the current density, the ionic liquid, and time. In various embodiments, the emulsion droplets can range, for example, in size from 1 nm to 10 nm, such as in a microemulsion. In various embodiments, emulsion droplets can range up to the order of millimeters. For example, at an initial time $T_0$, the initial emulsion droplets can be nanometer in size. However, at a second time, $T_1$, the size of the emulsion droplets can increase to millimeters in size. As the time progresses from an initial time $T_0$ to a time $T_1$, then it is believed that the emulsion droplets can solidify or coalesce to form larger emulsion droplets, as shown in FIGS. 5A-B. Moreover, the emulsion droplets cannot be the same size throughout the capillary, but can vary in size.

In various embodiments, the charge of the emulsion droplets can be controlled by the buffer composition, i.e., the emulsion droplets can be positive, negative, or have no charge. The charge of the emulsion droplets and the solute present in the buffer can be the same or different.

Figure 4:
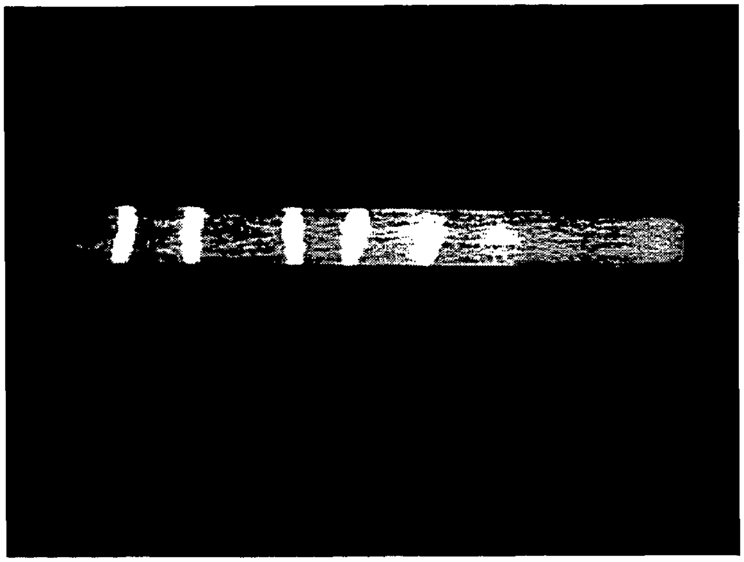
FIG. 4 illustrates a fluorescent image of an embodiment of the present teachings wherein the oligonucleotides are separated from the emulsion droplets.

The term "separation" and grammatical variations thereof as used herein refers to the process of separating charged species based on their charge/size. Separation can result from differentiating the charged species by charge/size ratio by using a separation polymer as known in the art of electrophoresis. The term "polymer"0 as used herein refers to oligomers, homopolymers, and copolymers and mixtures thereof as known in the art of polymer chemistry. For example, the polymer can be used to at least one of stabilize the emulsion or help separate the charged species associated with the emulsion droplets. In various embodiments, once the emulsion is formed, the emulsion droplets can be packed against a barrier. The solute, such as the charged species, can then be disassociated or separated from the emulsion droplets by using standard techniques. For example, the solute can be stripped from the emulsion droplets by reversing the direction of the voltage applied across the composition, such as shown in FIG. 4.

The timing of emulsion droplet formation and charged species travel can be correlated In the properties of the buffer as is known in the art of electrophoresis.

The emulsion droplets can be solidified to form solid phases, for example beads. Once formed, the beads can be used in standard chromatography or as, for example, a filtration grid in microfluidic devices. In various embodiments, the emulsion is formed at a first temperature, which is then decreased to a second temperature wherein the emulsion solidifies. For example, a composition including a biological sample, an ionic liquid, and a buffer can be at a first temperature ranging from 20° C. to 200° C. immediately prior to application of the voltage. In various embodiments, the emulsion droplets can be solidified by providing an ionic liquid having a combination of ions resulting in the solidification of the emulsion droplets.

In various embodiments, a reaction can be performed within the buffer. The term "reaction" refers to the process of reacting reactants to form reaction products within the buffer. A reaction can result from providing reaction conditions such as temperature changes to the reactants within the buffer. Several biological reactions are described herein. In various embodiments, the charged species can be concentrated to provide better detection of the reaction products by absorbance, spectroscopy (fluorescence or Raman), reflectance, colorimetry and any other detection known in the art of analysis of biological materials.

In various embodiments, the ionic liquid and buffer can be static or they can be in a continuous segmented flow. In various embodiments, continuous flow can provide the ability to pass the segments flowing through a channel through different process conditions such as water baths or other heating/cooling devices to thermally cycle the segments as in polymerase chain reaction (PCR), for example.

In various embodiments, the present teachings can provide a device for sample preparation including a substrate with at least one capillary channel. A capillary channel operates functionally like a capillary but is constructed by etching or cutting a volume into a portion of the substrate. The capillary channel can be difficult to fill with an emulsion. The present teachings permit introduction of the emulsion into the capillary channel for samples preparation. A solution of ionic liquids and buffer can be introduced into the capillary channel such that an emulsion forms separating biomolecules and bioparticles. At least two electrodes can provide a voltage across the capillary channel to form the emulsion. In various embodiments, the device has a network of capillary channels and a plurality of electrodes to provide multiple emulsions.

In various embodiments, the emulsion includes emulsion droplets with biomolecules that can be separated from the bioparticles. In various embodiments, the emulsion droplets are solid.

In various embodiments, the device includes other unit operations such as PCR or ligase reaction for analysis, and detection of biomolecule analysis.

EXAMPLES

The following examples are illustrative and are non-limiting to the present teachings.

Example 1

Figure 2A:
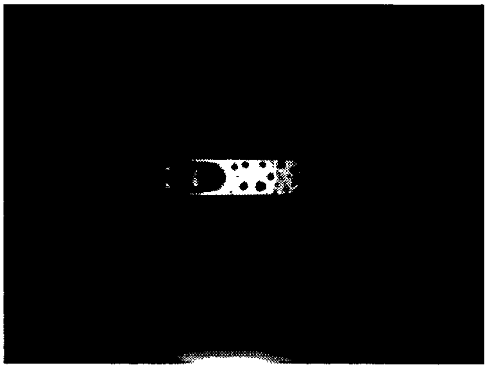
FIGS. 2A-B illustrate fluorescent images of an embodiment of the present teachings showing formation of emulsion droplets in a buffer.
Figure 2B:
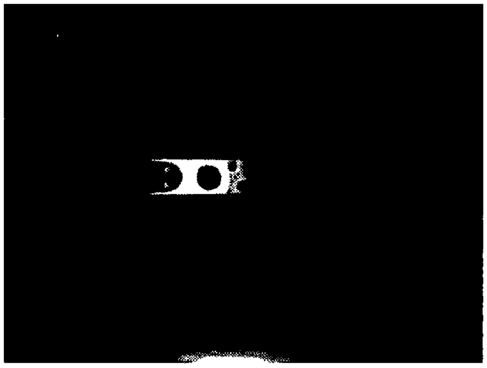

FIGS. 2A-B are exemplary illustrations of various embodiments of the invention. FIG. 2A illustrates an embodiment wherein a voltage was applied across a composition including a buffer, an ionic liquid, and oligonucleotides. In a period of minutes, the oligonucleotides appeared to associate with the small emulsion droplets. The oligonucleotides were dragged toward the positive electrode. As illustrated in FIG. 2B, near the ionic liquid/buffer interface, the emulsion droplets collided and fused, forming larger emulsion droplets. At higher voltages (e.g. 500 v) the oligonucleotides became disassociated with the emulsion droplets and continued to move toward the positive electrode whereas the emulsion droplets moved toward the negative electrode.

Figure 3A:
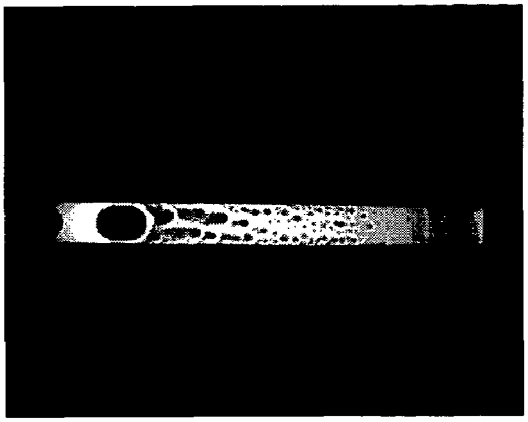
FIGS. 3A-B illustrate a fluorescent and actual image of an embodiment of the present teachings showing formation of emulsion droplets in a buffer.
Figure 3B:
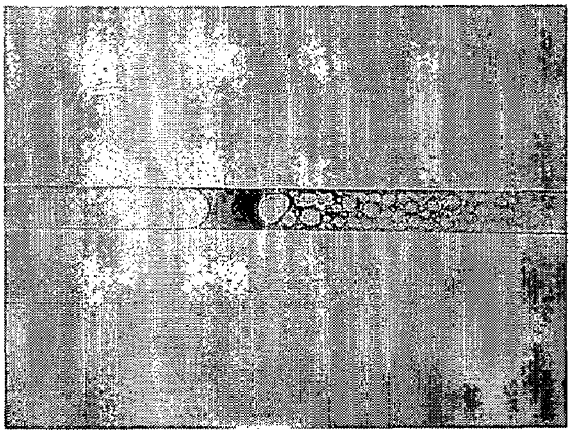

FIGS. 3A-B are exemplary illustrations of various embodiments of the invention. FIG. 3A illustrates the formation of emulsion droplets in a buffer wherein the emulsion was detected by fluorescence imaging. FIG. 3B illustrates the formation of emulsion droplets in a buffer wherein the emulsion was detected by transmitted light.

Example 2

Figure 6A:
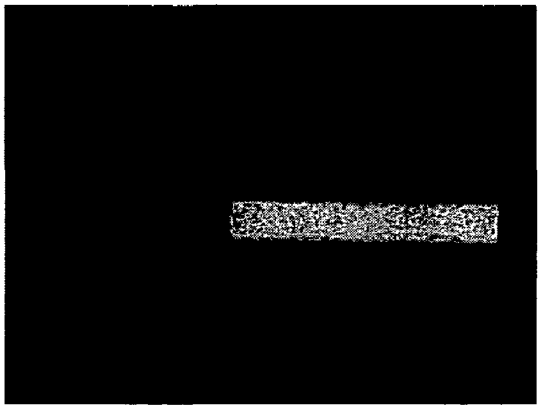
FIGS. 6A-B illustrate a fluorescent and an actual image of an embodiment of the present teachings wherein small and uniform emulsion droplets are packed and seen under fluorescence light (FIG. 6A) and transmission light (FIG. 6B).
Figure 6B:
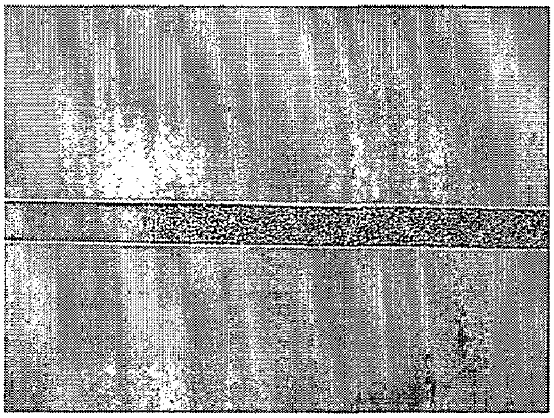

A buffer, TRIS-EDTA with 0.5% of POP-6® (Applied Biosystems, Foster City), containing a sample of oligonucleotides, a mixture of 30 and 90 base oligonucleotides labeled with Lys, and an ionic liquid, a 50:50 mixture of 1-butyl-3-methylimidazolium hexafluorophosphate (BMI $PF_6$) and 1,2-dimethyl-3-butylimidazolium hexafluorophosphate (DMBI $PF_6$) from Sachem, Inc. (Austin, Tex.) were introduced into a capillary tube. A voltage of 1000 v was applied for 20 minutes. The oligonucleotides acted as "seeds" for the formation of the emulsion droplets which then associated with the oligonucleotides. This is illustrated by FIG. 6A wherein the formation of small and uniformly packed emulsion droplets is seen under fluorescence light. FIG. 6B shows small and uniformly packed emulsion droplets seen under transmission light.

The oligonucleotides and associated emulsion droplets were packed against a barrier. The oligonucleotides disassociated from the emulsion droplets when the voltage was changed from positive to negative as illustrated in FIG. 4.

Example 3

An emulsion was formed in a capillary as described in Examples 1 and 2. After an hour the small emulsion droplets began to coalesce as shown in FIG. 5A. After 24 hours, the emulsion droplets had coalesced into larger droplets as shown in FIG. 5B.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "less than 10" includes any and all subranges between (and including) the minimum value of zero and the maximum value of 10, that is, any and all subranges having a minimum value of equal to or greater than zero and a maximum value of equal to or less than 10, e.g., 1 to 5.

It is noted that, as used in this specification and the appended claims, the singular forms "a," "an," and "the," include plural referents unless expressly and unequivocally limited to one referent. Thus, for example, reference to "a charged species" includes two or more different charged species. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to various embodiments described herein without departing from the spirit or scope of the present teachings. Thus, it is intended that the various embodiments described herein cover other modifications and variations within the scope of the appended claims and their equivalents.

What is claimed is:

1. A method for separating a solute from a sample, the method comprising:

applying a voltage across a composition comprising the sample, an ionic liquid, and a buffer to form an emulsion, which includes emulsion droplets; and separating the solute from the sample, wherein the solute is a positively charged species.

2. The method of claim 1, wherein the emulsion droplets have an electrical charge.

3. A method of for separating a solute from a sample, the method comprising:

applying a voltage across a composition comprising the sample, an ionic liquid, and a buffer to form an emulsion, which includes emulsion droplets; and separating the solute from the sample, wherein the charge of the emulsion droplets and the solute is the same.

4. A method of for separating a solute from a sample, the method comprising:

applying a voltage across a composition comprising the sample, an ionic liquid, and a buffer to form an emulsion, which includes emulsion droplets; and separating the solute from the sample, wherein the charge of the emulsion droplets and the solute is different.

5. The method of one of claims 1, 3 and 4, wherein the sample is a biological sample.

6. The method of one of claims 1, 3 and 4, wherein the solute is chosen from biomolecules and bioparticles.

7. The method of claim 6, wherein the bioparticles are chosen from cells and organelles.

8. The method of claim 6, wherein the biomolecules are chosen from DNA and RNA.

9. The method of one of claims 1, 3 and 4, wherein the composition is at a temperature ranging from 20° C. to 200° C. immediately prior to application of the voltage.

10. The method of one of claims 1, 3 and 4, wherein the size of the emulsion droplets is controlled by at least one of the buffer composition, the current density, and the ionic liquid.

11. A method of separating a solute from a sample comprising, applying a voltage across a composition comprising the sample, a buffer, and an ionic liquid to form an emulsion, which includes emulsion droplets;

packing the emulsion droplets against a barrier; and stripping the solute from the emulsion droplets.

12. The method of claim 11, wherein the solute is stripped from the emulsion droplets by reversing the direction of the voltage applied across the composition.

13. A device of for sample preparation, the device comprising:

a substrate comprising at least one capillary channel comprising a solution comprising an ionic liquid and a buffer, wherein the solution is adapted to form an emulsion for separating biomolecules and bioparticles; and at least two electrodes adapted to provide a voltage across the capillary to form the emulsion, which includes emulsion droplets with biomolecules, wherein the emulsion droplets are solid.

* * * * *